United States Patent [19]
Walowit et al.

[11] Patent Number: 5,131,057
[45] Date of Patent: Jul. 14, 1992

[54] METHOD FOR VIDEO-TO-PRINTING IMAGE RESOLUTION CONVERSION

[75] Inventors: Eric Walowit, Springboro; Ann Winans, Dayton; Kefu Xue, Beavercreek, all of Ohio

[73] Assignee: Wright State University, Dayton, Ohio

[21] Appl. No.: 478,607

[22] Filed: Feb. 12, 1990

[51] Int. Cl.$^5$ .......................... G06K 9/40; G06K 9/44
[52] U.S. Cl. ........................................ 382/41; 382/54; 358/166
[58] Field of Search ........................ 382/41, 27, 54, 52, 382/55; 358/96, 284, 166, 428, 444, 447; 340/728; 364/526, 559

[56] References Cited

U.S. PATENT DOCUMENTS

| | | | |
|---|---|---|---|
| 4,783,840 | 11/1988 | Song | 358/166 |
| 4,789,933 | 12/1988 | Chen et al. | 382/54 |
| 4,849,914 | 7/1989 | Medioni et al. | 382/54 |

OTHER PUBLICATIONS

Smith & Davis, "A new Algorithm for Edge Detection," Jun. 10, 1974, pp. 55-61.
Miyake et al., "A New Interpolation Algorithm of Television Pictures for Compact Printing System," SPSE's 40th Annual Conference and Symposium on Hybrid Imaging Systems, pp. 17-20 (1987).
Tzou et al., "Subjectively Adapted Interpolation," Electronic Imaging '86, pp. 144-148 (1986).
Pokorny et al., Computer Graphics: The Principles Behind Art and Science, pp. 260-262 (Franklin, Beedle and Assoc. 1989).
Marr, Vision, pp. 54-61 (W. H. Freeman and Co. 1982).

*Primary Examiner*—Michael Razavi
*Attorney, Agent, or Firm*—Killworth, Gottman, Hagan & Schaeff

[57] ABSTRACT

A method of improving image resolution by interpolation combines the concept of convolution with a parameter-controlled mask, with the concept of adjustment of the mask based on edge information. In the method, first the edge information is extracted from the original image data, and then interpolated to the size to which the original image data will be interpolated. With the guidance of the interpolated edge information, the interpolation process will produce an image with high contrast but minimal artifacts. A spline-under-tension function is applied to generate interpolated values, the function being modified for image data points located close to edges.

3 Claims, 1 Drawing Sheet

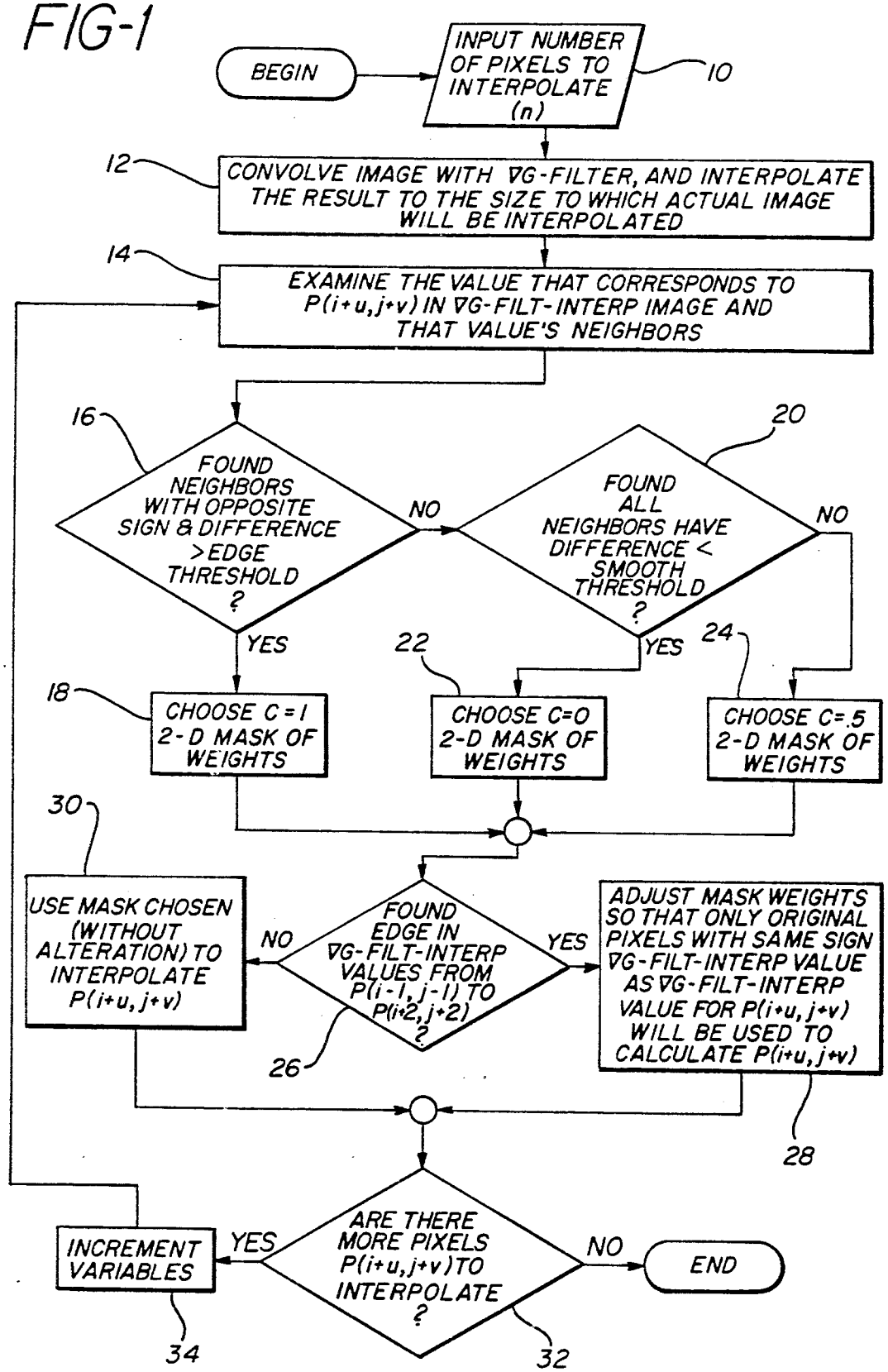

METHOD FOR VIDEO-TO-PRINTING IMAGE RESOLUTION CONVERSION

BACKGROUND OF THE INVENTION

The present invention relates generally to processing of an input image, especially from a video source, to improve spatial resolution for output to a high quality printing device. To improve the video signal spatial resolution for printing, the algorithm of the present invention applies an adaptive spatial interpolation technique to the video signal. The algorithm is based on a computer graphics curve-fitting algorithm with the addition of edge-restricted interpolation to sharpen edges and to enhance image details. Therefore, the new interpolation algorithm will not only improve the spatial resolution but also improve the sharpness of the printed image.

It has become increasingly important to get high quality prints from TV or other video signals in the desktop publishing and multi-media environment. Normally, a video signal has very low spatial resolution compared with the spatial resolution of printing devices. Hard copy from direct printing of a video signal is usually very poor in quality.

In order to produce a quality print of a video image, the resolution of the video signal must be increased to the resolution of the printing device. This increase in resolution must be accomplished by some interpolation algorithm. Interpolation of an image, whether video or otherwise, involves the estimation of pixel values located between known pixel values. Bilinear and high-order interpolations are generally preferred over the blocky pixel replication interpolation. However, these preferred interpolations result in a certain degree of blurring in the interpolated image. In order to preserve the sharpness of the image, its edge information should be considered in the interpolation process. In Miyake et al, "A New Interpolation Algorithm of Television Pictures for Compact Printing System," *SPSE's 40th Annual Conference and Symposium on Hybrid Imaging Systems*, pp. 17-20 (1987), dealing with the printing of video images, the interpolation was accomplished by convolution with a mask of coefficients. The mask employed a parameter that permitted the coefficients to be altered to change the appearance of the interpolated image. With the parameter equal to zero, the mask essentially provided a bilinear interpolation. However, the interpolation algorithm did not take into account edge information. In Tzou et al, "Subjectively Adapted Interpolation," *Electronic Imaging '86*, pp. 144-148 (1986), which did consider edge information, the interpolation algorithm used a variable interpolation filter which could be adjusted to any one of eight angle orientations. The orientation of the filter was adjusted throughout the interpolation process to the orientation most closely coinciding with the orientation of an edge present in the image. Since that algorithm only considered the edge information of eight angle orientations, the resulting image showed only moderate improvement over the bilinear interpolation.

SUMMARY OF THE INVENTION

The interpolation method of the present invention combines the concept of convolution with a parameter-controlled mask, with the concept of adjustment of the mask based on edge information. The key concern when applying edge information in image interpolation is avoidance of artifacts. In the disclosed method, first the edge information is extracted from the original image data, and then interpolated to the size to which the original image data will be interpolated. With the guidance of the interpolated edge information, the interpolation process will produce an image with high contrast but minimal artifacts.

The method improves image resolution for an image defined by a plurality of known, original image points $P_{i,j}$ by interpolating additional points $P_{i+u, j+v}$, where $0 \leq u < 1$ and $0 \leq v < 1$. While explained in greater detail below, the method includes convolving the original image points with a Laplacian Gaussian filter to produce a filtered image defined by filtered original image points. A two-dimensional spline-under-tension function, having a tension control parameter C equal to 0.5 is applied to the filtered image to generate a filtered interpolated image including filtered interpolated image points at the desired resolution.

Beginning with one of the filtered interpolated image points, the following steps are performed:

a) comparing the value of the filtered interpolated point to the values of neighborhood points within the filtered interpolated image;

b) in the event the filtered interpolated point value is of opposite sign to at least one of the neighboring point values, and differs from at least one of the neighboring point values by more than a predefined threshold value, setting the tension control parameter at a predetermined value $C_1$, where $0 < C_1 \leq 1.0$ and performing step e) (these conditions occur when a sharp edge is encountered);

c) in the event the conditions of step b) for the filtered interpolated point are untrue, and the filtered interpolated point value differs from all of the neighboring point values by less than the threshold value, setting the tension control parameter at a predetermined value $C_2$ where $0 \leq C_2 < C_1$ and performing one of steps e) and f) (these conditions occur when the image is "smooth" in the area in question);

d) in the event the conditions of both steps b) and c) for the filtered interpolated point are untrue, setting the tension control parameter at a predetermined value $C_3$ where $C_2 < C_3 < C_1$ and performing one of steps e) and f);

e) in the event the filtered interpolated point value is of opposite sign to at least one of the neighboring point values (indicating presence of an edge), applying the two-dimensional spline-under-tension function using the tension control parameter as set in one of steps b), c) and d), and using only ones of the original image points having corresponding filtered original image point values of the same sign as the filtered interpolated point value to generate an interpolated point $P_{i+u, j+v}$;

f) in the event the condition of step e) is untrue, applying the two-dimensional spline-under-tension function using the tension control parameter as set in one of the steps b), c) and d), and using the original image points to generate an interpolated point $P_{i+u, j+v}$.

The steps a) through f) are then repeated for each of the filtered interpolated points. The image is then assembled from the original image points and the interpolated points together.

BRIEF DESCRIPTION OF THE DRAWINGS

FIG. 1 is a flow chart diagram of an interpolation method according to the present invention.

DETAILED DESCRIPTION OF THE PREFERRED EMBODIMENTS

The method described herein will be referred to as the Edge-Restricted Spline-Under-Tension (ERSUT) interpolation method. The ERSUT image interpolation method is based on a computer graphics curve interpolation algorithm. Therefore, a brief explanation of that curve interpolation algorithm will be presented before the ERSUT image interpolation method will be described. In general, the interpolating graphics curves are called "splines under tension". While the curves are not truly splines, they are built up from basic curves similar to the uniform B-spline. The "tension" portion of the name of the curves refers to the tension control parameter employed in the algorithm to decrease or increase the slack in the curve. Advantages of the "splines under tension" are that they interpolate through given points and the computation of the interpolation is relatively simple, as opposed to interpolation curves such as the cubic B-spline.

The "spline under tension" algorithm uses four consecutive points (these are the control points or knots) to interpolate points between the two middle points. If (1) the four consecutive points are designated as $P_{i+1}$, $P_i$, $P_{i+1}$, and $P_{i+2}$, (2) the variable c represents the tension control parameter, and (3) the variable u indicates the fractional position of interpolated point $P_{i+u}$ between original points $P_i$ and $P_{i+1}$, then the interpolating curve $C(u)$ can be expressed as $$C(u) = (u^3 \; u^2 \; u \; 1) \begin{pmatrix} -c & 2-c & c-2 & c \\ 2c & c-3 & 3-2c & -c \\ -c & 0 & c & 0 \\ 0 & 1 & 0 & 0 \end{pmatrix} \begin{pmatrix} P_{i-1} \\ P_i \\ P_{i+1} \\ P_{i+2} \end{pmatrix}. \quad (1)$$

The useful range of values for the tension control parameter, c, is given by $\{c \in R: 0.0 \leq c \leq 1.0\}$. Values of c less than 0.0 lead to loops in the curve at the control points, while c values greater than 1.0 cause loops between the control points. The greatest tension in the interpolated curve results from $c=0$. In this case, the "curve" is essentially linear connections of the control points. The curve exhibits the greatest slack when $c=1$. When the tension control parameter has a value of 0.5 the curve is known as a Catmull-Rom curve. See, Pokorny et al, *Computer Graphics: The principles behind art and science*, pp. 260–262 (Franklin, Beedle and Assoc. 1989).

The values of the variable u are determined by the number of points to be interpolated between each two control points, and are always fractional values between 0 and 1. If just one point is interpolated between each two, the $u = \frac{1}{2}$. If two points are interpolated between each two, $u = \{\frac{2}{3}, \frac{1}{3}\}$. In general, if n represents the number of points to be interpolated, $$u = \left( \frac{n}{n+1}, \frac{n-1}{n+1}, \ldots \frac{1}{n+1} \right). \quad (2)$$

If the product given in equation (1) is multiplied through, then the value of the curve at interpolated point $P_{i+u}$ is given by $$\begin{aligned}P_{i+u} = & [-cu^3 + 2cu^2 - cu]P_{i-1} + [(2-c)u^3 + (c-3)u^2 + 1]P_i \\ & + [(c-2)u^3 + (3-2c)u^2 + cu]P_{i+1} + [cu^3 - cu^2] \\ & \cdot P_{i+2}.\end{aligned} \quad (3)$$

If $$\left( \frac{n}{n+1}, i-1 \right)$$

represents the weight placed on the point $P_{i-1}$ in calculating $$P_i + \frac{n}{n+1},$$

then a one-dimensional mask of weights for interpolating n points is given by $$\begin{aligned}&\left(0 \left(\frac{n}{n+1}, i-1\right) \ldots \left(\frac{1}{n+1}, i-1\right) 0 \left(\frac{n}{n+1}, i\right) \ldots \left(\frac{1}{n+1}, i\right) 1\right. \\ &\left. \left(\frac{n}{n+1}, i+1\right) \ldots \left(\frac{1}{n+1}, i+1\right) 0 \left(\frac{n}{n+1}, i+2\right) \ldots \left(\frac{1}{n+1}, i+2\right) 0\right).\end{aligned} \quad (4)$$

Specifically, if the number of points being interpolated is $n=2$, then those two interpolated points are denoted $P_{i+\frac{1}{3}}$ and $P_{i+\frac{2}{3}}$, and, for each point, equation (3) simplifies to $$P_{i+\frac{1}{3}} = \frac{-2c}{27} P_{i-1} + \frac{4c+7}{27} P_i + \frac{2c+20}{27} P_{i+1} + \frac{-4c}{27} P_{i+2} \quad (5)$$

and $$P_{i+\frac{2}{3}} = \frac{-4c}{27} P_{i-1} + \frac{2c+20}{27} P_i + \frac{4c+7}{27} P_{i+1} + \frac{-2c}{27} P_{i+2}. \quad (6)$$

Incorporating the weights given in equations (5) and (6), the general one-dimensional mask of weights given in (4) becomes the specific one-dimensional mask $$\left( 0 \; \frac{-2c}{27} \; \frac{-4c}{27} \; 0 \; \frac{4c+7}{27} \; \frac{2c+20}{27} \; 1 \; \frac{2c+20}{27} \; \frac{4c+7}{27} \; 0 \; \frac{-4c}{27} \; \frac{-2c}{27} \; 0 \right). \quad (7)$$

The symmetry about the center weight, 1, in the mask above is independent of the number of points being interpolated. Any n-point interpolation will exhibit such symmetry. This fact greatly simplifies the next step in the development of the ERSUT interpolation method.

The discussion thus far has only been concerned with the "spline under tension" curve interpolation algorithm. In order to find application for image interpolation, the concept of curve interpolation must be extended one more dimension to surface interpolation. A two-dimensional mask of weights is created by forming a Cartesian product of the one-dimensional mask of weights, given in (4), with itself. Due to the symmetry of the one-dimensional mask, if the two-dimensional mask is separated into four quadrants, these quadrants are symmetric about the weight in the center of the mask, which will again be a weight of 1. Therefore, only the weights in one quadrant of the mask need be calculated; the other three quadrants are merely reflections of that quadrant. If the weights are calculated for the upper left quadrant of the mask, then the upper right quadrant is a reflection to the right, and the two lower quadrants are formed by reflecting the two upper quadrants down. For the specific case of a two-point interpolation, the upper left quadrant of the two-dimensional mask is shown below. This was formed from the one-dimensional mask in (7).

$$G(x,y) = \left(\frac{1}{2\pi\sigma^2}\right)\exp\left(-\frac{x^2+y^2}{2\sigma^2}\right), \quad (9)$$

then the Laplacian ($\nabla^2$) of this is represented by $$\nabla^2 G = \frac{\partial^2 G(x,y)}{\partial x^2} + \frac{\partial^2 G(x,y)}{\partial y^2} = \quad (10)$$

$$\left(\frac{-1}{\pi\sigma^4}\right)\left(1 - \frac{x^2+y^2}{2\sigma^2}\right)\exp\left(-\frac{x^2+y^2}{2\sigma^2}\right).$$

According to Marr, *Vision*, pp. 54-61 (W. H. Freeman and Co. 1982), the $\nabla^2 G$ filter is the most satisfactory means of locating intensity changes in an image. The result of the convolution of the $\nabla^2 G$ filter with the original image will be referred to as the $\nabla^2 G$-filtered image. The $\nabla^2 G$-filtered image contains positive and negative values with an overall average of zero. Neighboring values of opposite sign indicate a zero-crossing in the second derivative of the image, which corresponds to an intensity change in the image. By thre- $$\begin{pmatrix} 0 & 0 & 0 & 0 & 0 & 0 & 0 \\ 0 & \frac{4c^2}{27^2} & \frac{8c^2}{27^2} & 0 & \frac{-2c(4c+7)}{27^2} & \frac{-2c(2c+20)}{27^2} & \frac{-2c}{27} \\ 0 & \frac{8c^2}{27^2} & \frac{16c^2}{27^2} & 0 & \frac{-4c(4c+7)}{27^2} & \frac{-4c(2c+20)}{27^2} & \frac{-4c}{27} \\ 0 & 0 & 0 & 0 & 0 & 0 & 0 \\ 0 & \frac{-2c(4c+7)}{27^2} & \frac{-4c(4c+7)}{27^2} & 0 & \frac{(4c+7)^2}{27^2} & \frac{(4c+7)(2c+20)}{27^2} & \frac{4c+7}{27} \\ 0 & \frac{-2c(2c+20)}{27^2} & \frac{-4c(2c+20)}{27^2} & 0 & \frac{(4c+7)(2c+20)}{27^2} & \frac{(2c+20)^2}{27^2} & \frac{2c+20}{27} \\ 0 & \frac{-2c}{27} & \frac{-4c}{27} & 0 & \frac{4c+7}{27} & \frac{2c+20}{27} & 1 \end{pmatrix} \quad (8)$$

With the introduction of this second dimension, some additional notation must be included in the discussion. In the first dimension, pixels were indexed with the subscript i, and $P_{i+u}$ indicated a pixel interpolated between $P_i$ and $P_{i+1}$. In the second dimension, pixels shall be indexed with the subscript j, and $P_{i+u,j+v}$ will indicate a pixel interpolated between $P_{i,j}$, $P_{i,j+1}$, and $P_{i-1,j+1}$. If the pixel to be interpolated, $P_{i-u,j-v}$, is in line with a row or column of control pixels, then its gray-level value will be a weighted sum of the gray levels of the four closest control pixels in line with it, as described previously for curve interpolation. However, if the pixel to be interpolated is not in line with any row or column of control pixels, then its gray-level value will be a weighted sum of the gray levels of the sixteen nearest surrounding control pixels. Specifically, the sixteen pixels form a four-by-four square with the upper left pixel identified as $P_{i-1,j-1}$ and the lower right pixel identified as $P_{i+2,j+2}$.

In the ERSUT interpolation method, and referring to the flowchart diagram in FIG. 1, the actual interpolation process is preceded by a preprocessing stage at 10 and 12 intended to produce well-defined edges in the interpolated image. The goals of this stage are (1) to identify locations of edges in the original image, and then (2) to predict the locations of edges in the interpolated image. In the first part of this stage, shown at 12, the original image is convolved with a Laplacian Gaussian filter. If the Gaussian distribution, in two dimensions, is represented by sholding the difference of neighboring values having opposite signs, the locations of edges in the original image can be accurately identified, and this information can be used to achieve better contrast along edges in the interpolation process.

Bearing in mind that the $\nabla^2 G$-filtered image contains positive and negative values, the actual location of edges generally lies between original pixels that correspond to opposite-signed neighboring values. Since new pixel values will be determined in the interpolation process and placed between original pixels, it is important to predict the location of edges in the interpolated image before the interpolation begins. Accordingly, in this second part of the preprocessing stage, the $\nabla^2 G$-filtered image is interpolated to the same size to which the original image will be interpolated. The interpolation of the $\nabla^2 G$-filtered image is performed by the two-dimensional Catmull-Rom "spline under tension" algorithm. Recall that the Catmull-Rom specification indicates that the mask of weights employs a tension control parameter of c = 0.5. With the completion of this preprocessing stage, locations of edges for the yet-to-be-interpolated image are determined, and this information, stored in the $\nabla^2 G$-filtered-interpolated image, will be used to influence the interpolation of the actual image.

The image interpolation process involves three different "splines under tension". The three masks of weights are formed with three different tension control parameters values: c = 1.0, c = 0.5, and c = 0.0. For each known pixel, an examination is made of the pixel's neighbors at 14.

The mask based on c = 1.0 is used to interpolate pixels along edges and in detailed areas of the image. Such edges and details are indicated by inspecting the $\nabla^2 G$-filtered-interpolated image for adjacent values of opposite sign and thresholding the difference of those values by a preselected edge threshold value, as described above and shown at 16 and 18.

For smooth areas of the image, the c = 0.0 mask performs the interpolation. These smooth areas are indicated by adjacent $\nabla^2 G$-filtered-interpolated values whose difference does NOT exceed the preselected smooth threshold value. See blocks 20 and 22.

If neither edges nor smoothness are indicated by thresholding adjacent $\nabla^2 G$-filtered-interpolated image values, then the pixels that correspond to those values are interpolated using the c = 0.5 Catmull-Rom mask of weights shown at 20 and 24.

The selection of the two threshold values are based on individual preference. The choice of a threshold value for edges depends on how "hard" or "soft" the interpolated image is to appear. A "hard" image has sharp edges that are defined by significant intensity differences. Conversely, the edges of a "soft" image are blurred and indistinct. If the edge threshold is chosen to be a small value, the image will appear harder. This is because a lower edge threshold will identify smaller differences as edges. Increasing the edge threshold value causes the appearance of the image to become softer as fewer differences will be identified as edges. Based on our experience, a gray scale difference of 20 or more is perceived as a significant edge by human eyes. In the ERSUT method, an image gray scale difference of 20 most closely corresponds to $\nabla^2 G$-filtered-interpolated values that differ by 5.0. Therefore, in the simulations of the algorithm, an edge threshold value of 5.0 has been adopted. Similarly, it has been found that neighboring $\nabla^2 G$-filtered-interpolated values that differ by 3.0 or less correspond to smooth areas in the image. Accordingly, the method incorporates a smooth threshold value of 3.0.

Once the mask with the appropriate tension control value (c = 1.0, 0.5, or 0.0) has been selected for the interpolation of a particular pixel, $P_{i+u, j+v}$, all of the $\nabla^2 G$-filtered-interpolated values that lie within the square region from upper left corner corresponding or original pixel $P_{i-1, j-2}$ to lower right corner corresponding to original pixel $P_{i+2, j+2}$ are examined at 26 for indication of an edge, using the same edge threshold described above. Since the $\nabla^2 G$-filtered image has undergone interpolation, both $\nabla^2 G$-filtered values originally calculated from the image and $\nabla^2 G$-filtered values interpolated from those calculated values are inspected for evidence of zero-crossings.

If evidence of an edge is found within that square region, the ERSUT method branches at 28 to an edge-restricted version of the "spline under tension" interpolation, which will be discussed shortly. If, however, there is no indication of an edge, the "spline under tension" mask explained above (with c = 0.5 or 0.0) is used at 30 to weight the gray-level values of the sixteen nearest pixels to determine the gray-level value of interpolated pixel $P_{i+u, j+v}$.

If an edge is detected in the search of the surrounding square region, the edge-restricted branch of the algorithm will adjust the weights of the "spline under tension" mask (c = 1.0, 0.5, or 0.0) before applying it to the sixteen nearest pixels. The adjustments made to the mask depend upon the sign of the $\nabla^2 G$-filtered-interpolated image value corresponding to the pixel being interpolated. If, for example, that pixel has a $\nabla^2 G$-filtered-interpolated value that is negative, then only those original pixels that correspond to negative $\nabla^2 G$-filtered-interpolated values will be used in the calculation of that pixel value. In order to keep the mask one-weighted, the sum of the weights that would have been applied to original pixels with positive $\nabla^2 G$-filtered-interpolated values is evenly distributed to the weights for original pixels with negative $\nabla^2 G$-filtered-interpolated values. The effect of this adjustment of weights is that the gray level of a pixel interpolated close to an intensity edge is calculated only from those original pixels on the "same side" of the edge; pixels on the "opposite side" of the edge make no contribution. This edge-restricted branch of the method should lead to an interpolated image which exhibits significant, visually-pleasing contrast along edges and enhancement of image details.

The program repeats if necessary at blocks 32 and 34.

The ERSUT interpolation method produces a higher contrast image than the image resulting from bilinear interpolation, and at the same time, ERSUT interpolation introduces minimal artifacts. This minimization of artifacts is due primarily to the $\nabla^2 G$-filtered-interpolated image. Therefore, a video signal which is interpolated by the ERSUT interpolation method before printing should result in a print of high quality.

While the methods described herein constitute preferred embodiments of this invention, it is to be understood that the invention is not limited to these precise methods, and that changes may be made therein without departing from the scope of the invention, which is defined in the appended claims.

What is claimed is:

1. A method of improving image resolution for an image defined by a plurality of known, original image points $P_{i,j}$ each having an original point value, by interpolating additional points $P_{i+u, j+v}$, where $0 \leq u < 1$ and $0 \leq v < 1$, comprising the steps of:

convolving said original point values with a Laplacian Gaussian filter to produce a filtered image defined by filtered original point values;

applying to said filtered original point values a two-dimensional spline-under-tension function having a tension control parameter C equal to $C_0$, to generate a filtered interpolated image including filtered interpolated image points at a desired resolution, each of said filtered interpolated image points having a filtered interpolated point value;

for one of said filtered interpolated image points:

a) comparing said filtered interpolated point value to the values of neighborhood points within a predetermined neighborhood of said filtered interpolated image;

b) in the event said filtered interpolated point value is of opposite sign to at least one of said neighboring point values, and differs from at least one of said neighboring point values by more than a predefined threshold value, setting said tension control parameter at a predetermined value $C_1$, where $1 < C_1 \leq 1.0$ and performing step e);

c) in the even the conditions of step b) for said filtered interpolated point are untrue, and said filtered interpolated point value differs from all of said neighboring point values by less than said threshold value, setting said tension control parameter at a predetermined value $C_2$ where $0 \leq C_2 < C_1$ and performing step e);

d) in the event the conditions of both steps b) and c) for said filtered interpolated point are untrue, setting said tension control parameter at a predetermined value $C_3$ where $C_2 < C_3 < C_1$ and performing step e);

e) applying said two-dimensional spline-under-tension function using said tension control parameter as set in one of said steps b), c) and d), and using only ones of said original image points within said neighborhood having corresponding filtered original point values of the same sign as said filtered interpolated point value to generate one of the interpolated points $P_{i+u, j+v}$;

repeating steps a) through e) for each of said filtered interpolated image points; and assembling an image from said original image points and said interpolated points $P_{i+u, j+v}$, said assembled image having improved image resolution over said image defined only by said original image points.

2. The method of claim 1 wherein $C_0 = 0.5$.

3. The method of claim 2, wherein $C_1 = 1.0$, $C_2 = 0$ and $C_3 = 0.5$.

* * * * *

UNITED STATES PATENT AND TRADEMARK OFFICE
CERTIFICATE OF CORRECTION

PATENT NO. : 5,131,057
DATED : July 14, 1992
INVENTOR(S) : Walowit et al

It is certified that error appears in the above-identified patent and that said Letters Patent is hereby corrected as shown below:

Col. 8, Line 64, "where $1<c_1$" should be-- $0<c_1$--.

Col. 8, Line 65, "in the even" should be--in the event--.

Signed and Sealed this

Twenty-fourth Day of August, 1993

Attest:

BRUCE LEHMAN

Attesting Officer

Commissioner of Patents and Trademarks